March 24, 1925. 1,531,009
D. D. KORTH
MACHINE FOR SEALING WRAPPERS ON BLOCKS OF CHEESE
Filed May 12, 1924 4 Sheets-Sheet 1
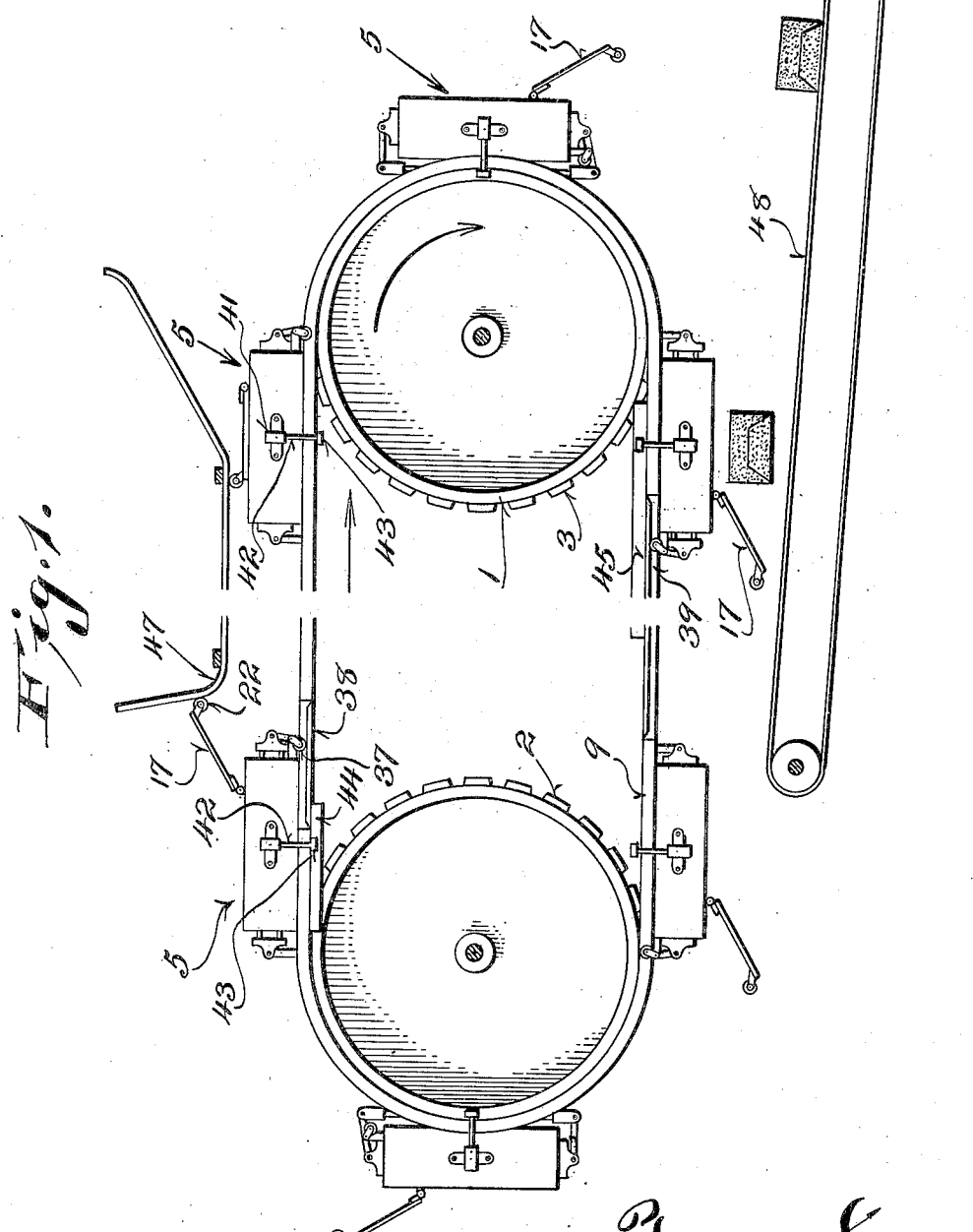

March 24, 1925.
D. D. KORTH
1,531,009
MACHINE FOR SEALING WRAPPERS ON BLOCKS OF CHEESE
Filed May 12, 1924 4 Sheets-Sheet 2
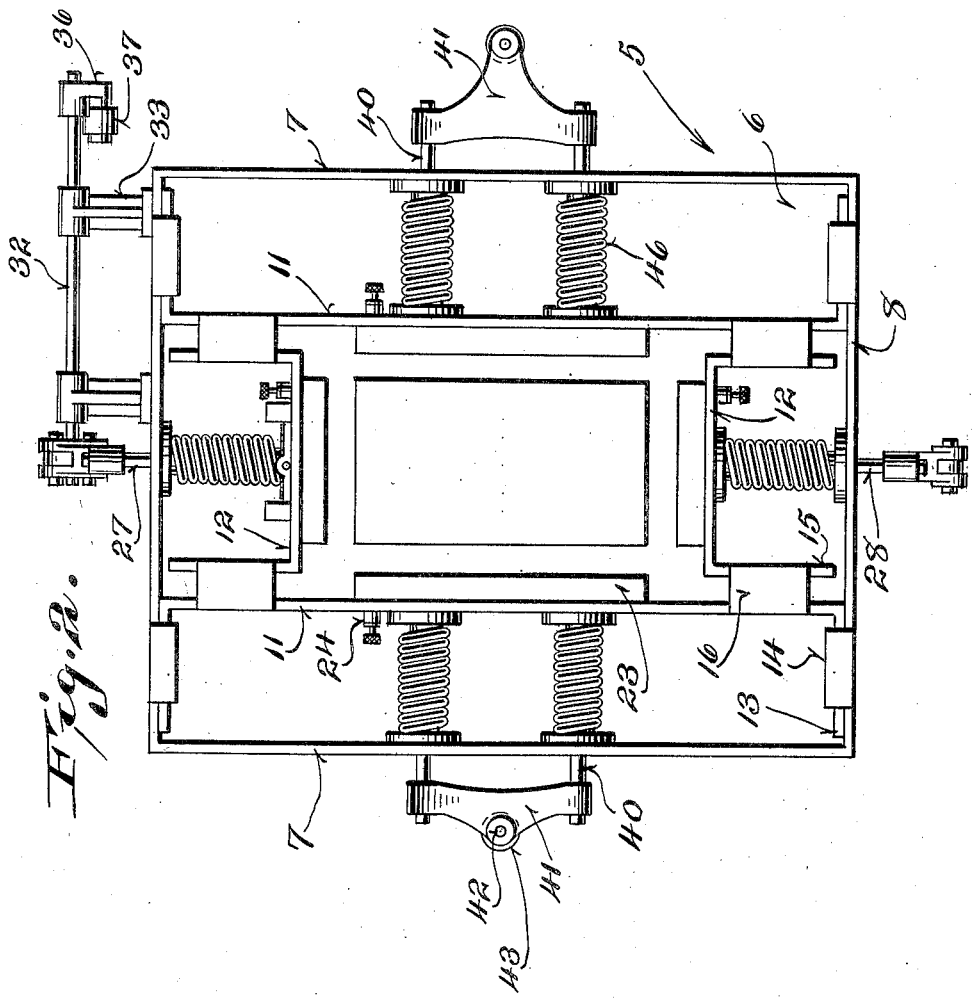

March 24, 1925.
D. D. KORTH
1,531,009
MACHINE FOR SEALING WRAPPERS ON BLOCKS OF CHEESE
Filed May 12, 1924 4 Sheets-Sheet 3
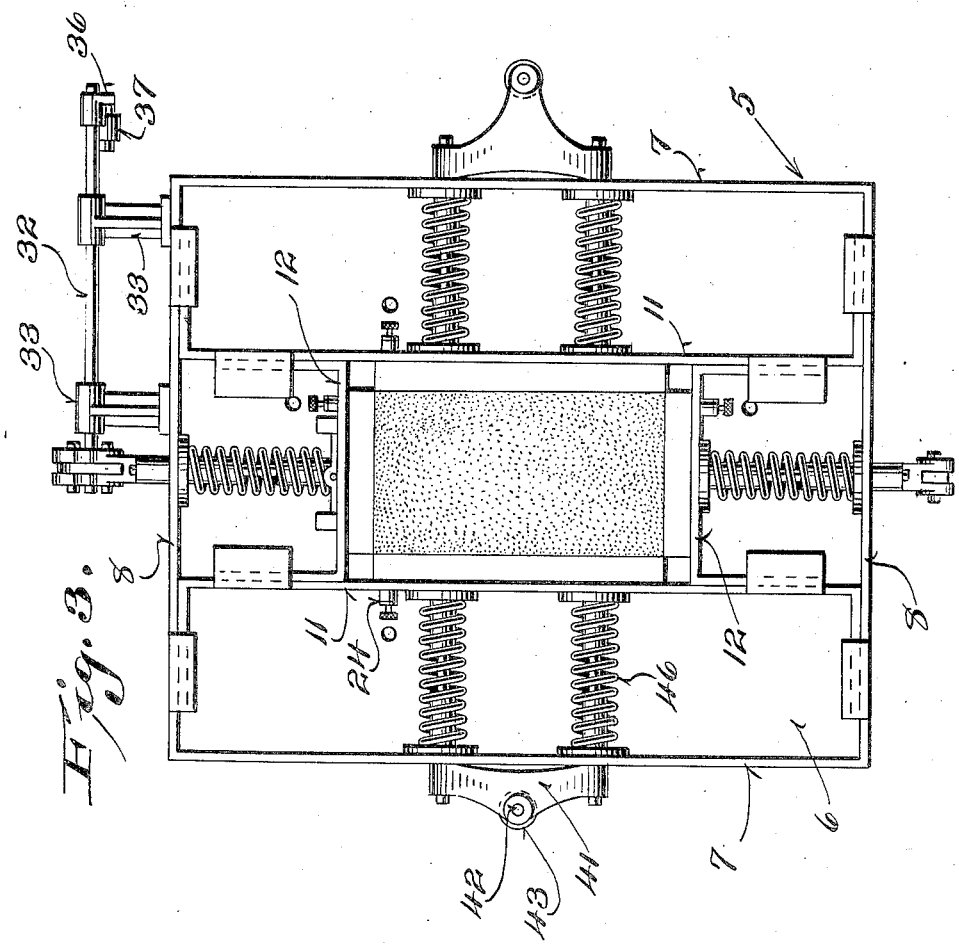

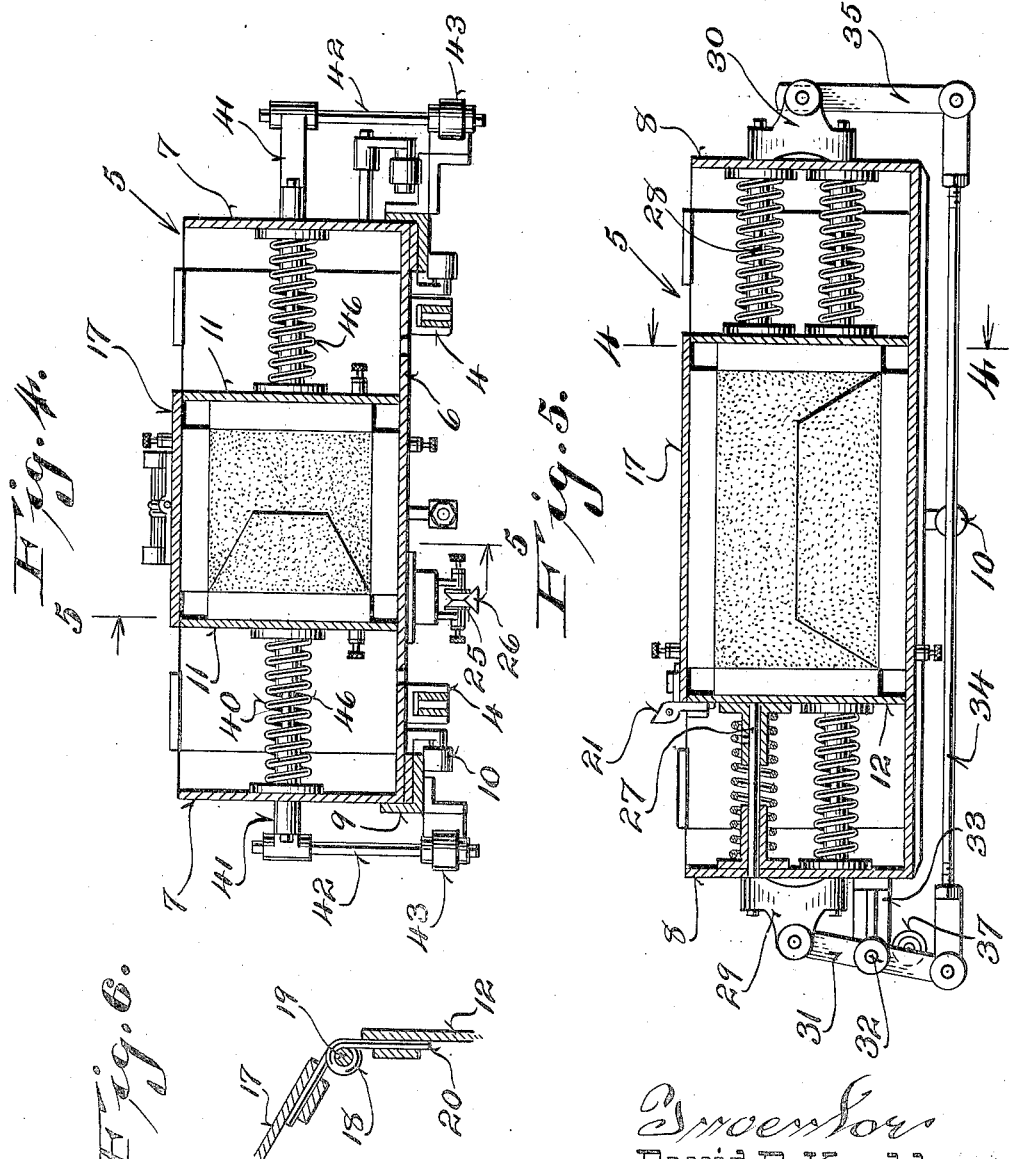

Patented Mar. 24, 1925.

1,531,009

UNITED STATES PATENT OFFICE.

DAVID D. KORTH, OF ANTIGO, WISCONSIN.

MACHINE FOR SEALING WRAPPERS ON BLOCKS OF CHEESE.

Application filed May 12, 1924. Serial No. 712,777.

*To all whom it may concern:*

Be it known that I, DAVID D. KORTH, a citizen of the United States, and resident of Antigo, in the county of Langlade and State of Wisconsin, have invented certain new and useful Improvements in Machines for Sealing Wrappers on Blocks of Cheese; and I do hereby declare that the following is a full, clear, and exact description thereof.

This invention relates to a machine for sealing the wrappers or blocks of cheese.

Objects of this invention are to provide a machine which is automatic in its action, which will continuously operate and seal the wrappers in an air tight manner upon blocks of cheese, which is so constructed that the wrapped blocks of cheese may be furnished the machine at one point, and the blocks with the sealed wrappers thereon discharged continuously at another point of the machine.

Further objects are to provide a machine which will automatically present compartments within which the wrapped blocks of cheese may be readily received, which will automatically apply heat and pressure to the outer sides of the wrappers on all sides of the block of cheese, and which will automatically release the block of cheese when the sealing is complete.

Further objects are to provide a machine which is of simple and strong construction, which may be most readily operated, and which is effective and rapid in its operation.

An embodiment of the invention is shown in the accompanying drawings, in which:—

Figure 1 is a diagrammatic side view of the essential portions of the machine showing it as it appears when in actual operation.

Figure 2 is an enlarged plan view of one of the receptacles within which the wrapped cheese is received, the parts being shown in open position, the cover being removed.

Figure 3 is a view corresponding to Figure 2 showing a wrapped block of cheese received within the compartment and showing the parts in closed position, the cover being removed.

Figure 4 is an end view of one of the compartments such view being a transverse sectional view on the line 4—4 of Figure 5.

Figure 5 is a sectional view on the line 5—5 of Figure 4.

Figure 6 is a fragmentary detail of the spring and hinged mounting of the cover.

The machine comprises a pair of drums or wheels 1 and 2 having parallel axes, one of such wheels being the driving wheel for the machine. These wheels are preferably provided with teeth 3 which engage chains 4 of an endless conveyor. This endless conveyor is provided with a plurality of members each of which is provided with heating and compressing mechanism. These members, indicated generally at 5, may be provided with bottoms 6, and with side and end walls 7 and 8, respectively.

If desired, a continuous track 9 may be provided and may be formed with horizontal stretches and with curved end portions conforming to the wheels or drums 1 and 2. These tracks are preferably formed of angle iron, as shown in Figure 4. The several members 5 are each provided with overhanging rollers 10 suitably supported by means of brackets for holding the members in position with reference to said track.

The members are of identical construction and, therefore, a detailed description of one will suffice. Each of the members comprise a rectangular member, as stated, composed of the bottom 6, and the side and end walls 7 and 8, although obviously, a different type of frame could be used. Within the frame or member a pair of movable sides 11 and movable ends 12 are provided. The sides 11 are equipped with outwardly turned terminal flanges or arms 13 which are guided by overhanging portions 14 carried by the member 5. The ends 12 are similarly provided with rearwardly projecting arms 15 guided by overhanging members 16 carried by the sides 11, as clearly shown in Figures 2 and 3. A top 17 is pivotally and resiliently supported from one of the end members 12 by means of the spring shown in Figure 6. It will be noted from this figure that the spring is provided with a looped portion 18 surrounding the pintle 19 which joins the pivotal ears of the top with the end member. The spring is further provided with outwardly projecting terminal arms 20 secured to the end 12 and the top 17, so as to urge the top towards open position. If desired, a stop 21, see Figure 5, may be carried by the end member to limit the extent of opening of the top.

It is to be noted from Figure 1 that the top is provided with a roller 22 for a purpose hereinafter to appear. Each of the walls of the inner compartment formed of the sides 11, end members 12, top 17 and the bottom portion 6 of the main frame member 5 is provided with an electrical heating element 23. These heating elements are of any standard type and may be supplied with electrical energy in any suitable manner. For example, one side of the elements may be ground and the other side may extend to a terminal post 24. In each case these terminal posts are connected by means of flexible members which are omitted from the drawings, for the sake of clearness, with a pair of conical rollers 25 carried by the underside of the bottom 6, as clearly shown in Figure 4 and insulated from the remaining portion of the device. These rollers are adapted to contact with a short portion of track 26 connected with one side of the main for supplying energy to the heater although, obviously any suitable means may be employed for connecting the heating elements with the electrical energy.

The front end member 12 is rigidly connected to a pair of operating plungers or rods 27 and the rear end member 12 is similarly connected to a pair of similar rods 28. The rods 27 and 28 are respectively secured to cross heads or connecting members 29 and 30 mounted exteriorly on the ends 8 of the unit 5. The member 29 is connected to one end of a lever 31 rigidly mounted upon a transverse shaft 32 carried by brackets 33 secured to the end member 8 of the unit or frame 5, as may be seen from Figures 2, 3, and 5. The other end of the lever 31 is connected by means of an extensible link 34 with a bar 35 rigidly secured to the member 30. The outer end of the shaft 32 is provided with a small bell crank lever 36 provided with a roller 37 adapted to contact with upper cam members 38 and 39 arranged adjacent the track 9, as may be seen from Figure 1.

The sides 11 are rigidly secured to parallel rods or plungers 40 which have their outer ends received in cross heads or connecting members 41. These members 41 are positioned exteriorly of the units 5 and are provided with downwardly extending rigid rods 42 which may, if desired, be provided with rollers 43 at their lower ends. These rollers are adapted to contact with upper and lower cam members 44 and 45, respectively, adjacent the cam members 38 and 39, as may be seen from Figure 1.

Helical springs 46 are positioned about each of the rods 27, 28 and 40 and urge the respective walls of the inner compartment inwardly.

In operation, the conveyor travels in the direction of the arrow in Figure 1 and carries the compartments upwardly adjacent the left hand end of the machine. When these compartments arrive at the cam members 44 and 38, such members operate the ends 12 and the sides 11 of the inner compartment and draw such walls outwardly, as shown in Figures 1 and 2. It is to be noted in this connection that the cams 44 are outwardly projecting members which force the rollers 43 apart and that the cam 38 is an upwardly projecting member which contacts with the roller 37 and thus rocks the shaft 32 and, through the link mechanism, operates the end members 12. At this point the device is adapted to receive a wrapped cheese as the inner compartment is fully open and such cheese may, therefore, be readily inserted.

It is to be noted that further motion of the unit 5 causes the roller 22, carried by the top 17 to contact with the upper cam member 47 and thus the cover is rocked downwardly into closed position. The heated walls of the inner compartment are thus pressed yieldingly by means of the springs 46 against the outer side of the wrapper of the enclosed cheese and the cheese is slightly melted or fused adjacent such wrapper and thus seals the wrapper hermetically to the cheese. Upon further motion of the members 5, the tops 17 open, as shown at the right hand end of the machine. However, the cheese is still retained in position by means of the grip of the side and end walls thereon. The lower cam members 39 and 45, however, open the sides and end members and allow the cheese to drop, as shown in Figure 1, upon any suitable type of conveyor 48 by means of which such cheeses are removed from the machine.

It will thus be seen that the cheeses wrapped with any suitable type of covering such as tin foil wrappers commonly employed may be readily sealed, or as is commonly termed singed, and thus the entire cake of cheese is hermetically sealed within the wrapper.

It will further be seen that the machine is continuous in its operation and will rapidly and effectively seal the cheeses within their wrappers.

It is further to be noted that although relatively complicated operations are performed that a sturdy and simple type of machine has been provided.

Although one form of the invention has been described in considerable detail, it is to be understood that the invention may be variously embodied and is, therefore, to be limited only as claimed.

I claim:

1. A continuously operating machine for sealing a wrapper to a block of cheese, said machine comprising a series of members adapted to receive a wrapped block of cheese, each member comprising a compartment having movable heated walls, and automatic means for opening said walls and for pressing said walls inwardly at regular periods during a cycle of the machine, whereby said compartment is automatically opened to receive a wrapped block of cheese and the heated walls automatically forced against said wrapped block of cheese and subsequently separated to discharge said cheese.

2. A continuously operating machine for sealing a wrapper to a block of cheese, said machine comprising a series of members adapted to receive a wrapped block of cheese, each member comprising a compartment having movable heated walls, automatic means for opening said walls and for yieldingly pressing said walls inwardly at regular periods during a cycle of the machine, whereby said compartment is automatically opened to receive a wrapped block of cheese and the heated walls automatically forced against said wrapped block of cheese and subsequently separated to discharge said cheese, and means for automatically advancing said compartments.

3. An automatic machine for sealing a wrapper to a block of cheese comprising a plurality of compartments adapted to receive wrapped blocks of cheese and having movable heated walls, means for moving said compartments around a closed path during each cycle of operating of the machine, automatic means for forcing said walls inwardly at one portion of the path of travel to force the heated walls tightly against the outer sides of a wrapped block of cheese, and automatic means operable at another part of the path of travel for separating said heated walls to discharge the resulting sealed cheese.

4. An automatic machine for sealing a wrapper to a block of cheese comprising a continuously traveling conveyor, a plurality of compartments carried thereby and adapted to receive wrapped cheeses, each compartment having movable heated walls, means for forcing said walls inwardly, and cam means for separating said walls at a definite point along the path of travel of said conveyor to discharge the blocks of cheese at such point.

5. An automatic machine for sealing a wrapper to a block of cheese comprising a continuously traveling conveyor, a plurality of compartments carried thereby and adapted to receive wrapped cheeses, each compartment having movable heated walls, means for forcing said walls inwardly, cam means for separating said walls at a definite point along the path of travel of said conveyor to discharge the blocks of cheese at such point, and means for receiving the discharged blocks of cheese at such point and for continuously removing them.

6. An automatic machine for sealing wrappers to blocks of cheese comprising a conveyor, means for supporting and driving said conveyor, a plurality of compartments carried by said conveyor and adapted to receive wrapped blocks of cheese, each compartment having movable walls provided with electrical heating elements, a track forming a portion of the supply circuit of said heating elements, a movable member carried by each compartment and adapted to contact with said track, springs for urging certain of said walls inwardly, and means for separating said walls against the action of said springs.

7. An automatic machine for sealing wrappers to blocks of cheese comprising a pair of spaced wheels with their axes horizontal, an endless conveyor carried by said wheels, a plurality of compartments adapted to receive wrapped blocks of cheese and having heated walls movably related to each other, a plurality of springs tending to force certain of said walls inwardly, means restraining the action of said springs for a portion of the travel of said conveyor, each compartment having a top biased to open position, and cam means for closing said top during a portion of the travel of said conveyor.

In testimony that I claim the foregoing I have hereunto set my hand at Antigo, in the county of Langlade and State of Wisconsin.

DAVID D. KORTH.